(12) United States Patent
Leehaug et al.

(10) Patent No.: US 10,234,031 B2
(45) Date of Patent: Mar. 19, 2019

(54) ENGINE CONTROL SYSTEM AND METHOD

(71) Applicant: Cummins Intellectual Properties, Inc., Minneapolis, MN (US)

(72) Inventors: Conor A. Leehaug, Columbus, IN (US); Joseph H. Scott, Summerville, SC (US); Andrew H. Bazan, Charleston, SC (US); Jiuzhu Yi, Mt. Pleasant, SC (US)

(73) Assignee: Cummins Inc., Columbus, IN (US)

( * ) Notice: Subject to any disclaimer, the term of this patent is extended or adjusted under 35 U.S.C. 154(b) by 746 days.

(21) Appl. No.: 14/257,051

(22) Filed: Apr. 21, 2014

(65) Prior Publication Data
US 2014/0229083 A1 Aug. 14, 2014

Related U.S. Application Data

(63) Continuation of application No. 13/122,069, filed as application No. PCT/US2009/064607 on Nov. 16, 2009, now Pat. No. 8,751,075.
(Continued)

(51) Int. Cl.
*F16H 61/68* (2006.01)
*B60W 10/06* (2006.01)
(Continued)

(52) U.S. Cl.
CPC ............ *F16H 61/68* (2013.01); *B60W 10/06* (2013.01); *B60W 10/11* (2013.01); *B60W 30/19* (2013.01); *B63H 21/21* (2013.01); *B63H 21/22* (2013.01); *F02D 31/002* (2013.01); *F02D 41/0225* (2013.01); *F16H 61/0403* (2013.01); *F16H 61/08* (2013.01); *F16H 61/16* (2013.01); *B60W 2300/32* (2013.01); *B60W 2510/0604* (2013.01); *B60W 2510/0638* (2013.01); *B60W 2510/10* (2013.01); *B60W 2710/10* (2013.01); *B60Y 2200/24* (2013.01); *B60Y 2200/42* (2013.01);
(Continued)

(58) Field of Classification Search
None
See application file for complete search history.

(56) References Cited

U.S. PATENT DOCUMENTS 2,883,876 A * 4/1959 Taylor .................... B63H 21/22
477/113
4,736,813 A * 4/1988 Hayama ............... B60K 31/107
180/177
(Continued)

FOREIGN PATENT DOCUMENTS

JP 08-246929 9/1996
JP 2001-041078 2/2001
(Continued)

*Primary Examiner* — Shelley Chen
(74) *Attorney, Agent, or Firm* — Faegre Baker Daniels LLP

(57) ABSTRACT

An engine control strategy for a marine vessel propulsion system receives a request for a gear from among plural transmission gears, determines an engine speed for the requested transmission gear shift, adjusts the engine to the determined speed for a predetermined amount of time, and prevents the requested transmission gear shift from occurring for the predetermined amount of time while maintaining the engine at the predetermined speed. After the predetermined amount of time elapses, the requested shift is allowed to occur.

14 Claims, 9 Drawing Sheets

Related U.S. Application Data

(60) Provisional application No. 61/114,694, filed on Nov. 14, 2008.

(51) Int. Cl.
| | | |
|---|---|---|
| *B60W 10/11* | (2012.01) | |
| *B60W 30/19* | (2012.01) | |
| *B63H 21/22* | (2006.01) | |
| *F02D 31/00* | (2006.01) | |
| *F02D 41/02* | (2006.01) | |
| *F16H 61/04* | (2006.01) | |
| *F16H 61/16* | (2006.01) | |
| *B63H 21/21* | (2006.01) | |
| *F16H 61/08* | (2006.01) | |
| *F02D 11/10* | (2006.01) | |
| *F02D 37/02* | (2006.01) | |
| *F16H 63/50* | (2006.01) | |

(52) U.S. Cl.
CPC ............ *F02D 11/105* (2013.01); *F02D 37/02* (2013.01); *F16H 63/502* (2013.01); *F16H 2306/40* (2013.01); *Y10T 477/688* (2015.01)

(56) References Cited

U.S. PATENT DOCUMENTS

| | | | | |
|---|---|---|---|---|
| 5,147,254 A * | 9/1992 | Baier | ...................... | F02B 67/04 180/53.7 |
| 5,211,680 A * | 5/1993 | Sumimoto | ............ | B60W 30/18 477/102 |
| 5,323,667 A * | 6/1994 | Tweed | ................... | B60W 30/18 477/107 |
| 5,498,195 A * | 3/1996 | White | ................... | B60W 10/06 477/110 |
| 5,668,727 A * | 9/1997 | Pellerito | ............. | F02D 41/0225 123/339.11 |
| 5,697,354 A | 12/1997 | Kato | | |
| 5,810,692 A * | 9/1998 | Takiguchi | ........... | F16H 61/0437 477/144 |
| RE36,007 E * | 12/1998 | White | ................... | B60K 31/00 477/91 |
| 6,470,852 B1 * | 10/2002 | Kanno | .................. | F02B 61/045 123/339.11 |
| 6,684,144 B2 * | 1/2004 | Sekii | ................. | F16H 61/0213 701/51 |
| 6,726,597 B2 * | 4/2004 | Yu | ......................... | B60W 10/06 477/121 |
| 7,377,827 B1 * | 5/2008 | Sturdy | .................. | B63H 21/22 440/84 |
| 7,678,014 B2 * | 3/2010 | Nohara | .................. | B60K 6/445 477/15 |
| 8,038,489 B2 * | 10/2011 | Suzuki | ................. | B63H 21/213 440/1 |
| 2002/0165065 A1 * | 11/2002 | Yu | ......................... | B60W 10/06 477/121 |
| 2005/0170930 A1 * | 8/2005 | Fett | ........................ | B60W 30/18 477/109 |
| 2007/0050119 A1 * | 3/2007 | Tamai | ................... | F02D 41/022 701/54 |
| 2008/0124989 A1 * | 5/2008 | Sturdy | .................. | B63H 21/22 440/75 |
| 2009/0011895 A1 * | 1/2009 | Tabata | ................... | B60K 6/445 477/3 |
| 2009/0023530 A1 * | 1/2009 | Iwase | ..................... | B60K 6/445 475/150 |
| 2009/0203481 A1 * | 8/2009 | Nohara | ................. | B60W 20/10 475/150 |
| 2009/0209151 A1 * | 8/2009 | Suzuki | ................. | B63H 21/213 440/86 |
| 2009/0269997 A1 * | 10/2009 | Suzuki | ................. | B63H 21/213 440/84 |

FOREIGN PATENT DOCUMENTS

| | | |
|---|---|---|
| JP | 2002-362196 | 12/2002 |
| JP | 2007099243 A * | 4/2007 |

\* cited by examiner

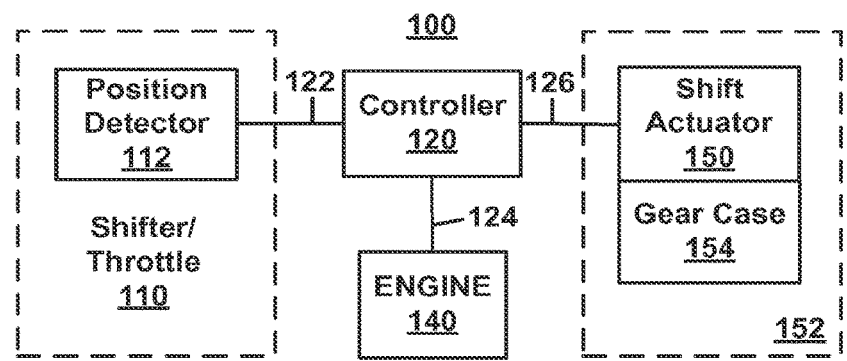
FIG. 1
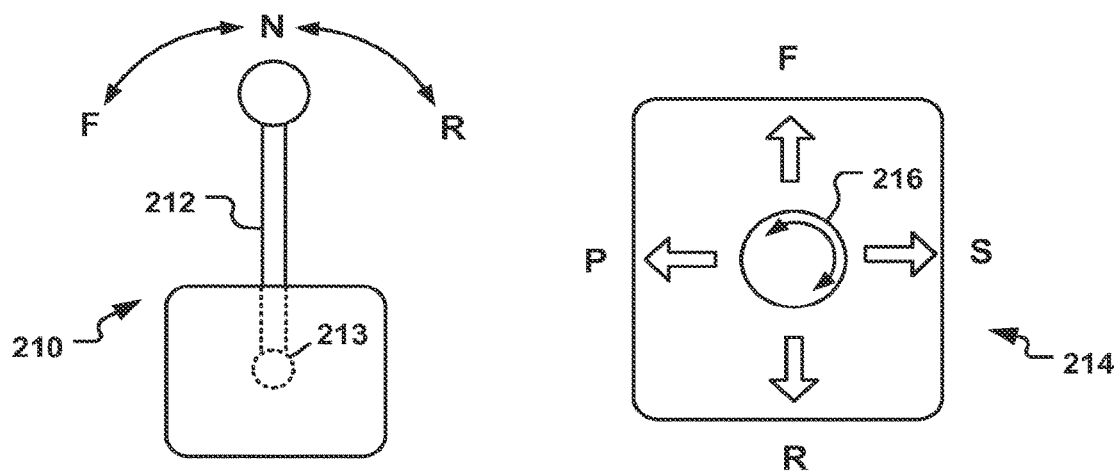
FIG. 2A
FIG. 2B

ENGINE CONTROL SYSTEM AND METHOD

RELATED APPLICATIONS

This application is a continuation of application Ser. No. 13/122,069, filed on Aug. 24, 2011, which is a national stage entry of International Application No. PCT/US09/64607, filed Nov. 16, 2009, which claims benefit to priority to Provisional Patent Application No. 61/114,694, filed on Nov. 14, 2008, the entire contents of which are hereby incorporated by reference.

TECHNICAL FIELD

This invention relates to an engine control system, and method, for controlling engine operation to improve gear shifting.

BACKGROUND

In a marine vessel propulsion system, such as an inboard, inboard/outboard, and outboard configuration, a transmission transmits power from the engine of the propulsion system to a propulsive force generator, such as a propeller. The transmission of such a system often produces a noticeable "clunking" vibration and sound when it is shifted into either a forward or reverse gear. Clunking occurs when a dog clutch or cone clutch that is rotating along with a shaft connected to the propulsive force generator suddenly engages with either a forward or reverse gear, which are rotating in correspondence with a drive gear coupled to the engine's output shaft.

Transmission gear clunking not only can cause an annoying sound and to the operator and passengers of a marine vessel, but also shock forces and heat generated from the undesirably high forces generated during impact shifting can cause drive components to fail. Elevated engine speeds during shifting also make the engines prone to stalling.

SUMMARY

Embodiments consistent with the claimed invention relate to an engine control strategies for facilitating gear shifting in a marine propulsion system. In one aspect, a requested shift is prevented from occurring until the speed of the engine of the propulsion system is reduced below a threshold value for a predetermined period of time.

In an embodiment consistent with the claimed invention, an engine control system of a marine vessel propulsion system includes a shifter and throttle control including movable element that generates a signal indicating a requested gear from among plural transmission gears and an engine throttle level corresponding to a position of the movable element, a controller connected to the shifter and throttle control and to an engine of the marine vessel propulsion system to monitor and control the speed of the engine, and a shift actuator moveably coupled to a clutch member that engages and disengages the requested transmission gear with a propulsion element. The controller is adapted to receive the shift and throttle request signal and to maintain the engine at a predetermined speed for a predetermined amount of time in response to the received request. The controller prevents the actuator from performing the requested shift for the predetermined amount of time while the engine is maintained at the predetermined speed, and allows the requested shift to occur after the predetermined amount of time elapses.

In another embodiment, a method of controlling an engine of a marine vessel propulsion system includes receiving a signal indicating a requested transmission gear shift and an engine throttle level, determining an engine speed for the requested transmission gear shift and adjusting the engine to the determined speed for a predetermined amount of time, preventing the requested transmission gear shift from occurring for the predetermined amount of time while maintaining the engine at the predetermined speed, and allowing the requested shift to occur after the predetermined amount of time elapses.

It is to be understood that both the foregoing general description and the following detailed description are exemplary and exemplary only and are not restrictive of the invention, as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings:

FIG. 1 is a block diagram of a marine vessel propulsion system in accordance with an exemplary embodiment.

FIG. 2A is a side view diagram of a lever type shifter and throttle control according to an exemplary embodiment.

FIG. 2B is a top view diagram of joystick type shifter and throttle control according to an exemplary embodiment.

DETAILED DESCRIPTION

Figure 3:
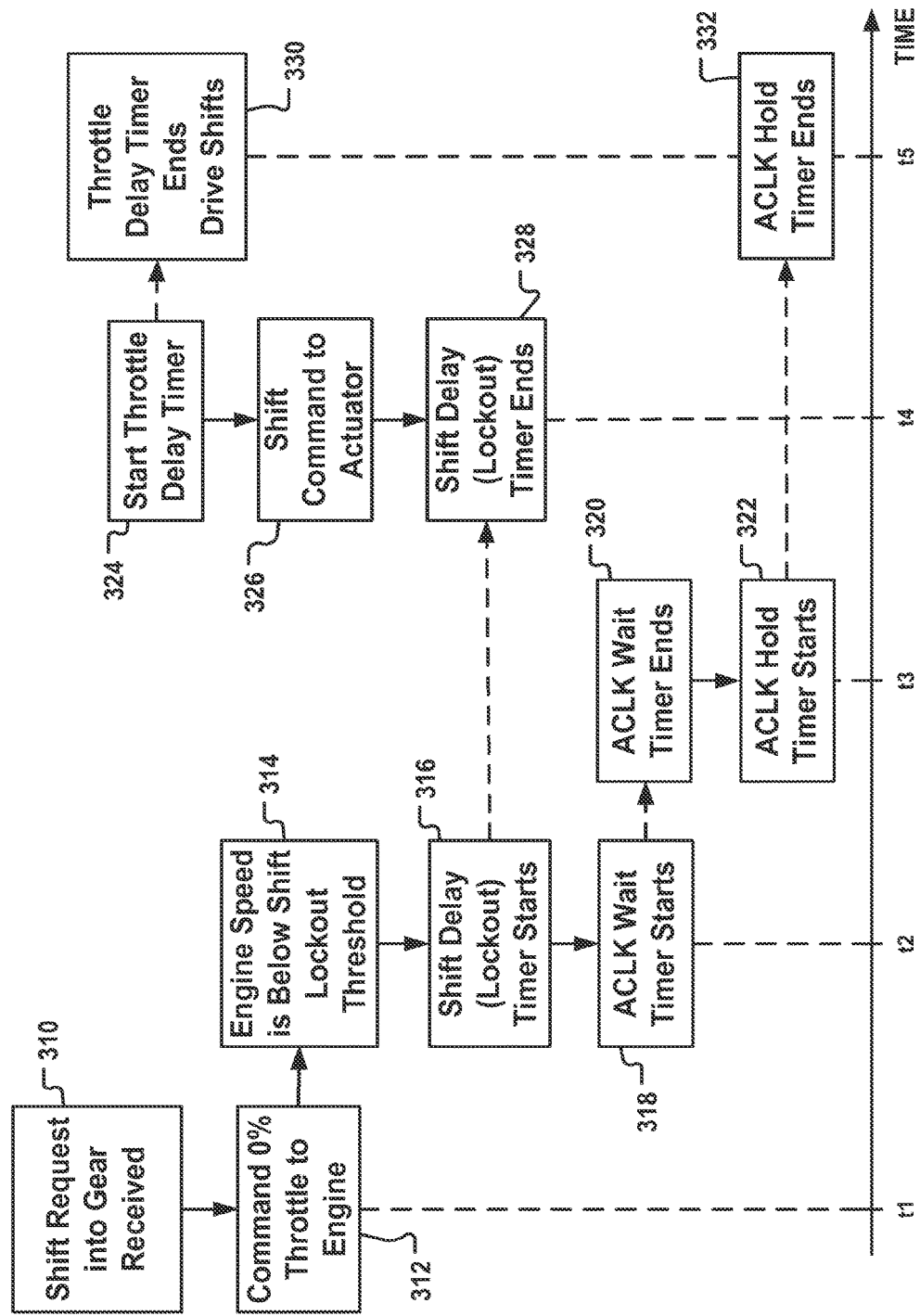
FIG. 3 is a graphical representation of a timeline showing an order of events of a shift and anticlunk strategy according to an exemplary embodiment.

The various aspects are described hereafter in greater detail in connection with a number of exemplary embodiments to facilitate an understanding of the invention. However, the invention should not be construed as being limited to these embodiments. Rather, these embodiments are provided so that the disclosure will be thorough and complete, and will fully convey the scope of the invention to those skilled in the art.

Many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions, such as program modules, being executed by one or more processors (e.g., a central processing unit (CPU) or microprocessor), or by a combination of both. Logic of embodiments consistent with the claimed invention can be implemented with any type of appropriate hardware and/or software, with portions residing in the form of computer readable storage medium with a control algorithm recorded thereon such as the executable logic and instructions disclosed herein, and can be programmed, for example, to include one or more look-up tables and/or calibration parameters. The computer readable medium can comprise a random access memory (RAM), a read-only memory (ROM), an erasable programmable read-only memory (EPROM or Flash memory), an optical fiber, and a portable compact disc read-only memory (CD-ROM), or any other solid-state, magnetic, and/or optical disk medium capable of storing information. Thus, various aspects can be embodied in many different forms, and all such forms are contemplated to be consistent with the scope of the claimed invention.

In conventional marine propulsion systems, engine speeds during shifting while in thrust vectoring mode (e.g., when using a joy-stick to control shifting and throttle) can be too high and cause high impact shifting having undesirably high forces. The resulting gear degradation makes the shifting experience noisy and can damage the drive. Additionally, elevated engine speeds during shifting also make the engines prone to stalling.

The invention provides a control strategy to improve vessel responsiveness and maneuverability, reduce gear vibration and/or noise arising from shock while shifting, prevent stalling during shifting, and prevent drive failures. The invention can be used across the power range of a marine vessel's propulsion system, and is especially effective during low speed vessel maneuvering to avoid excessive torque on the drive when shifting.

FIG. 1 shows an engine control system 100 for marine vessel propulsion system in accordance with an exemplary embodiment. The engine control system 100 can be used in any marine vessel propulsion system of plural configuration types, such as an inboard, inboard/outboard, or outboard types. As shown in FIG. 1, the engine control system 100 includes a shifter and throttle control 110 having a shifter/throttle position detector 112 for controlling the propulsion direction and speed. The shifter/throttle position detector 112 is communicatively connected to a controller 120 via channel 122. The controller 120, in turn, is communicatively connected to an engine 140 via channel 124, and to a shift actuator 150 of a transmission 152 via a channel 126. The actuator 150 can be energized by logic of the controller 120 to shift between a neutral state and forward or reverse gears of a gear case 154. The channels 122, 124 and 126 can be a controller area network (CAN) or CAN bus automotive network, although other known communications channels can be used to provide communication between devices. The term "communicatively connected," as used herein, can include any type of communications channel that can convey an electromagnetic signal, such as an optical fiber, wire or wireless channel.

An exemplary embodiment of the subject engine control system 100 can include an controller 120 electronically operable to implement the control strategy including, for example, executing logic/instructions, monitoring conditions of the engine, determining values/conditions, and commanding and/or controlling certain aspects of operation of the engine, by for example, controlling certain engine components, such as engine throttle, engine timing, the amount of fuel supplied to the engine and spark interruption. The electronic controller may be in communication with various engine and/or vessel sensors, such as engine throttle, engine speed, engine temperature, engine load, transmission speed, propeller speed, and vessel speed. The controller 120 may determine the shift request, check the thresholds disclosed herein, and determine or calculate the appropriate time delay(s). The controller 120 may be formed as an integral part of an engine control module (ECM), as a unit separate from an ECM, or more controllers that communicate with an ECM.

The position sensor 112 of the shift and throttle control 110 tracks the position and movement of a manipulatable element the throttle lever 120. The position sensor 112 can be a potentiometer that varies in output voltage in correspondence with the position of a manipulatable element of the throttle control 110, although another known analog or digital position sensor can be used. FIGS. 2A and 2B show shift and throttle controls according exemplary embodiments, which can include one or more position sensors to provide control in one or more dimensions.

As shown in FIG. 2A, a "one dimensional" lever type shifter and throttle control 210 includes a manipulatable lever 212 that is pivotably attached to a pivot 213 to allow rotational movement between a central neutral position N and a reverse position R or forward position F at either side of the neutral position N. The throttle increases as the lever is moved to a greater angle from a neutral position in either the forward F or reverse R directions. It will be appreciated that an alternative one-dimensional embodiment can include a linearly sliding member, a dial and the like to provide shifting between a neutral state and a driving forward or reverse gear, and a desired throttle magnitude while in one of the driving gears.

FIG. 2B is a top view of an embodiment of a joystick type shift and throttle control 214 having a stick 216 that can be manipulated in two dimensions. For example, the stick 216 can be moved in one of a forward (F), reverse (R), starboard (S), and port (P) direction, or in a direction oblique from one of the F, R, S or P directions, and can provide as much as 360 degrees of movement. The joystick throttle control can respond to pressure applied in a desired direction for proportional throttle control in the desired direction, and can have a resolution from as little as one speed to a continuum of proportional engine speed control. The joystick type shift and throttle control 214 can include a default position of the stick 216 at the center position, which corresponds to a neutral transmission state at an idling engine speed. In some embodiments, the stick 216 can be rotated about its central axis to provide rotational movement of the marine vessel.

The engine control system 100 shifts the transmission 152 "by wire" utilizing the communication channel 122 between the shifter and throttle 110, and the communication channel 126 between the controller 120 and the shift actuator 150. This allows for reduced shock, noise, and overspeed conditions because the timing of the shift and engine speed can be controlled based upon logic associated with the controller 120 and sensed conditions.

FIG. 3 is a diagram specifying an order or timing of events of an exemplary shift and anticlunk strategy in accordance with an embodiment. FIGS. 4 to 8 depict exemplary logic for performing engine control in a shift strategy according to an embodiment.

Referring now FIG. 3, a sequence of events of exemplary shift and anticlunk strategies in accordance with an engine control embodiment can be carried out upon receiving a shift request from a "neutral" state into an in-gear state, for example, when a shifter and throttle control 110 is manipulated to move it from a neutral state to a forward gear. The engine control system checks that engine speed is below a given maximum threshold value, "Shift Lockout Threshold," and then uses a series of timers to delay, or temporarily "lockout" a shift event and command a speed request to the controller 120.

Starting at time t1, in process 310 the controller 120 receives a signal from the shift and throttle control 110 and determines that a shift and throttle request has been made. For example, the controller 120 can detect a change in voltage output of at least one monitored potentiometer associated with the shifter and throttle control 110, which indicates that a shift is being requested. This detection causes the controller 120 to perform process 312 and command zero percent throttle to the engine 140.

At time t2, the controller 120 compares the monitored engine speed with a predetermined threshold value and determines, in process 314, when the speed of engine 140 is less than the Shift Lockout Threshold. At this time, the controller 120 starts a shift delay timer at process 316, which locks out the requested shift for the period of the shift delay timer.

Figure 4:
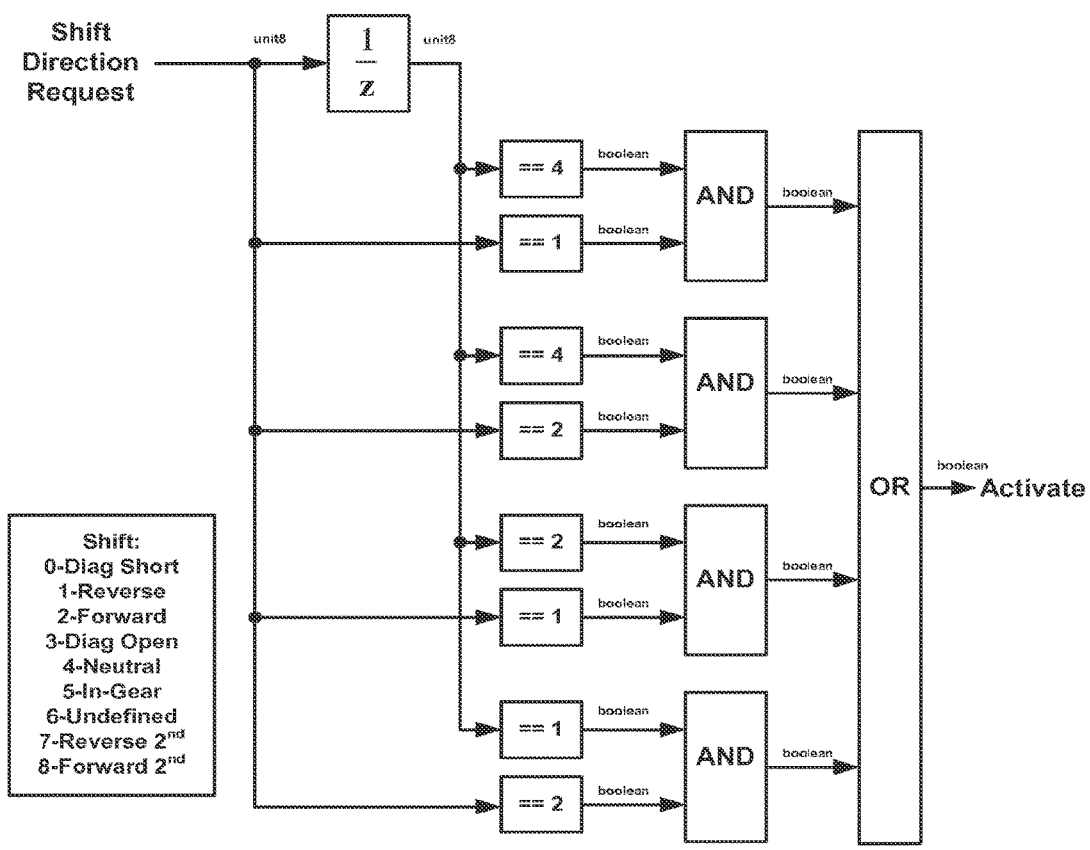
FIG. 4 is a diagram of control logic for activating an anticlunk strategy according to an exemplary embodiment.
Figure 5:
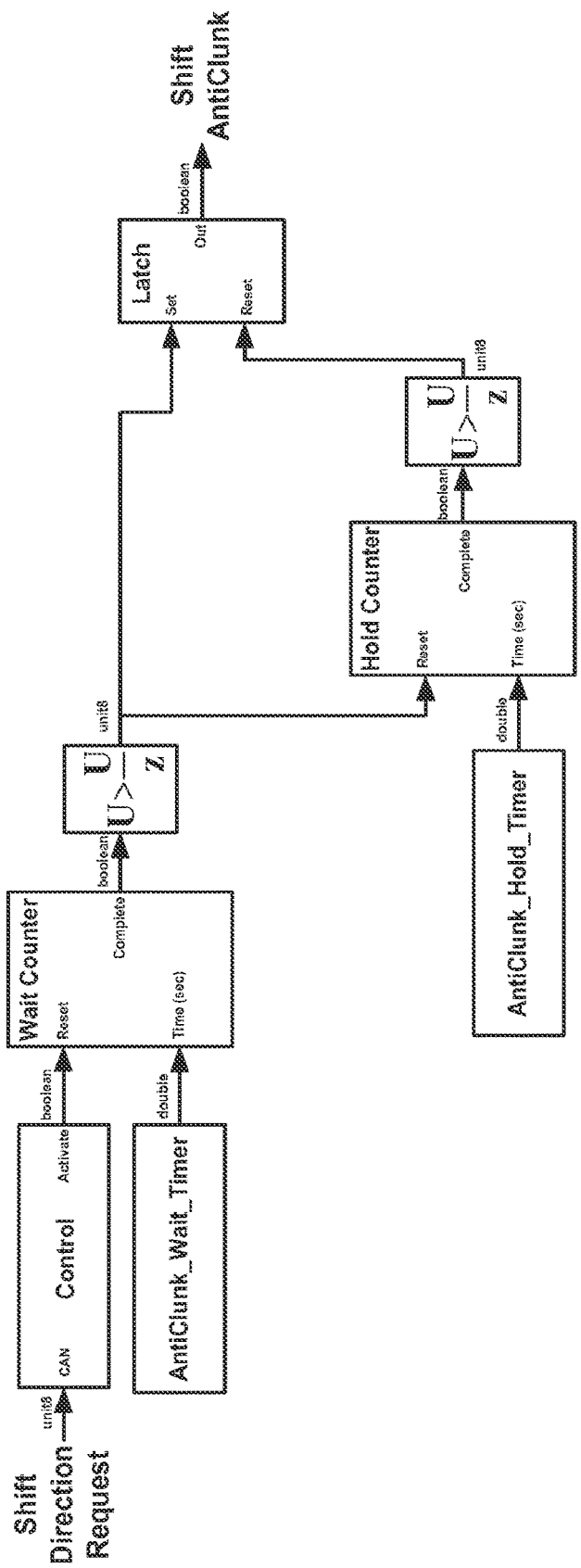
FIG. 5 is a diagram of timer control logic for an anticlunk strategy according to an exemplary embodiment.

FIGS. 4 and 5 show exemplary shift anticlunk control logic, which determines, based on the received shift type, whether to activate anticlunk logic including an AntiClunk_Wait_Timer and an AntiClunk_Hold_Timer. FIG. 4 shows the activation logic of the "Control" logic block of FIG. 5. As shown in FIG. 4, the Control block receives a "Shift Direction Request" from the helm (e.g., via movement of the shift and throttle control 110) and compares the received request to a previously made Shift Direction Request (i.e., "1/z" Shift Direction Request). The comparison logic in FIG. 4 involves determining whether a previously requested shift state and presently requested shift state satisfy an "in-gear" shift state, i.e., one which includes a shift from neutral (4) to reverse (1), neutral (4) to forward (2), forward (2) to reverse (1), and reverse (1) to forward (2). Although not shown in the FIG. 4 embodiment, shifting to an in-gear state can include shifts between gears in either the forward or the reverse direction, for example, a shift between $1^{st}$ to $2^{nd}$ gear in the reverse direction (i.e., 1 and 7), a shift between $1^{st}$ to $2^{nd}$ gear in forward direction (i.e., 2 and 8), and so on.

When the activation logic of FIG. 4 outputs a Boolean value indicating activation of the shift AntiClunk control, the "Control" block in FIG. 5 provides this activation value to the reset input of the Wait Counter, which causes the "AntiClunk_Wait_Timer" to start. This is represented in FIG. 3 as process 318 at time t2, "ACLK Wait Starts." When the Wait Counter counts until the value of the AntiClunk_Wait_Timer and expires at process 320, "ACLK Wait Ends," as shown at t3 in FIG. 3, the controller 120 commands "Shift AntiClunk" active to the engine 140 and holds this command active until the Hold Counter completes counting the "AntiClunk_Hold_Timer" value.

When the AntiClunk_Hold_Timer is running (i.e., Shift AntiClunk is active), the controller 120 holds a target, commanded speed until the shift is completed. During this time, the Shift Delay Timer expires, see process 328 at t4 in FIG. 3, and a shift command is sent to the shift actuator 150 at process 326.

Figure 6:
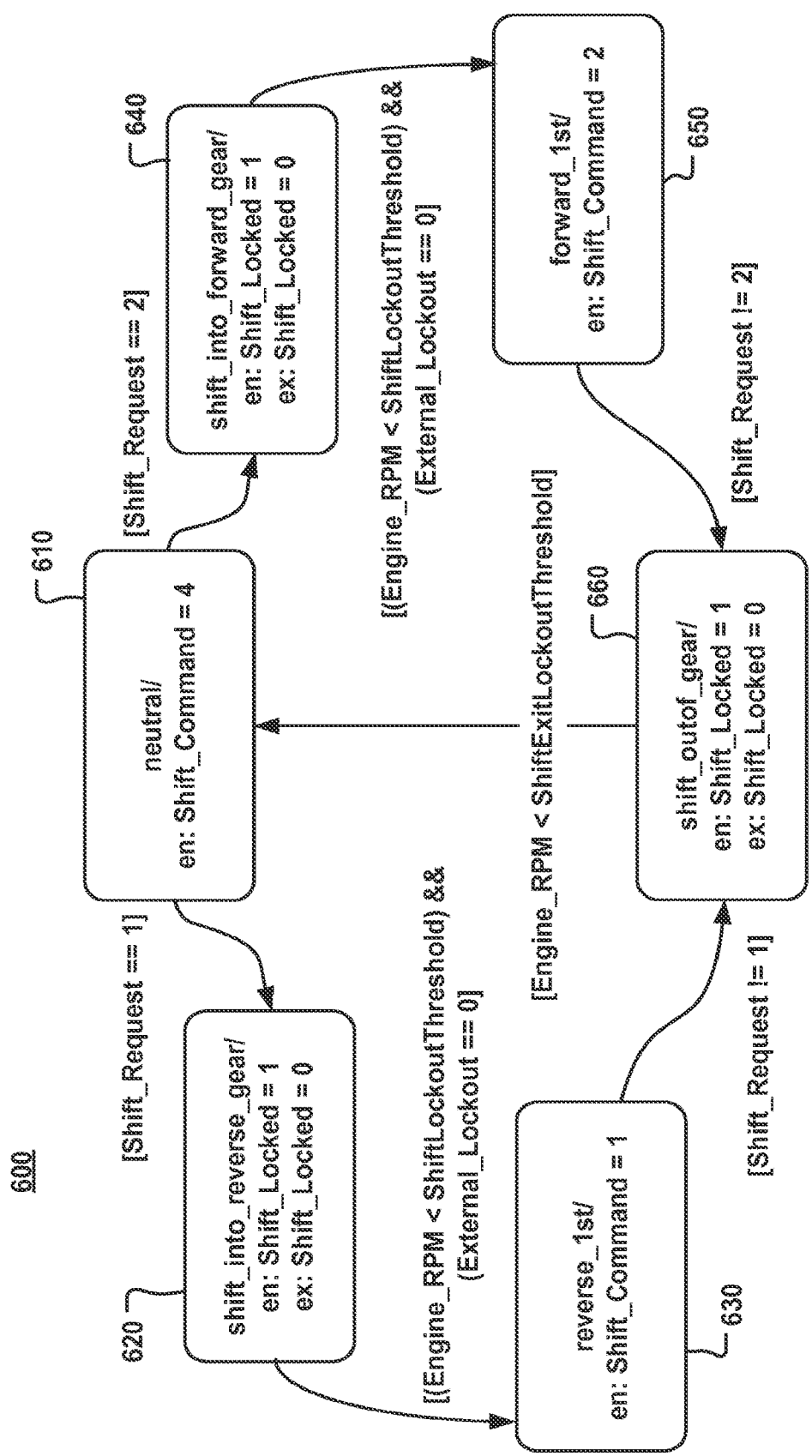
FIG. 6 is a diagram of a state machine for controlling shifting according to an exemplary embodiment.

FIG. 6 is a diagram of an exemplary state machine 600 that controls the shifting of the shift actuator 150 for shifts between a neutral state and an in-gear state (i.e., a first gear of either a forward or reverse direction), or between an in-gear state and the neutral state.

When a request for a new gear comes from the helm via a manipulation of the shifter and throttle control 110, the logic of the state machine 600 locks in a currently engaged gear until an RPM threshold is met. This is shown by the path from state 610, which represents the transmission in a neutral state, to a state 620 when the shift request is for a reverse gear (i.e., shift request=1) is locked in neutral until the engine RPM becomes less than the Shift Lockout Threshold. Thereafter, the newly requested reverse gear is commanded to the shift actuator 150 in state 630. Similarly, if a shift request for a forward gear is made while in the neutral state, the neutral state is locked in state 640 until the engine RPM becomes less than the Shift Lockout Threshold, and the requested forward gear is then commanded to the shift actuator in state 640.

When shifting from an "in gear" state to a "neutral" state, embodiments can employ a "Shift Exit Lockout Threshold" to only allow shifting into neutral only if engine speed is below this set point (threshold). This is shown in state machine of FIG. 6 by the path from state 630, which represents the transmission in a reverse state, to a state 660 when the shift request is for a neutral state (i.e., shift request!=1) and the reverse gear is locked until the engine RPM becomes less than the Shift Exit Lockout Threshold. Thereafter, the newly requested neutral state is commanded to the shift actuator 150 in state 610. Another path from an in-gear state to neutral is from state 650, which represents the transmission in a forward gear state, to a state 660 when the shift request is received for a neutral state (i.e., shift request!=2) and the forward gear is locked until the engine RPM becomes less than the Shift Exit Lockout Threshold. Thereafter, the newly requested neutral state is commanded to the shift actuator 150 in state 610. Allowing a shift into a neutral state from an in-gear state only if the engine speed is below a set point (Shift Exit Lockout Threshold) can prevent engine overspeed conditions.

Figure 7:
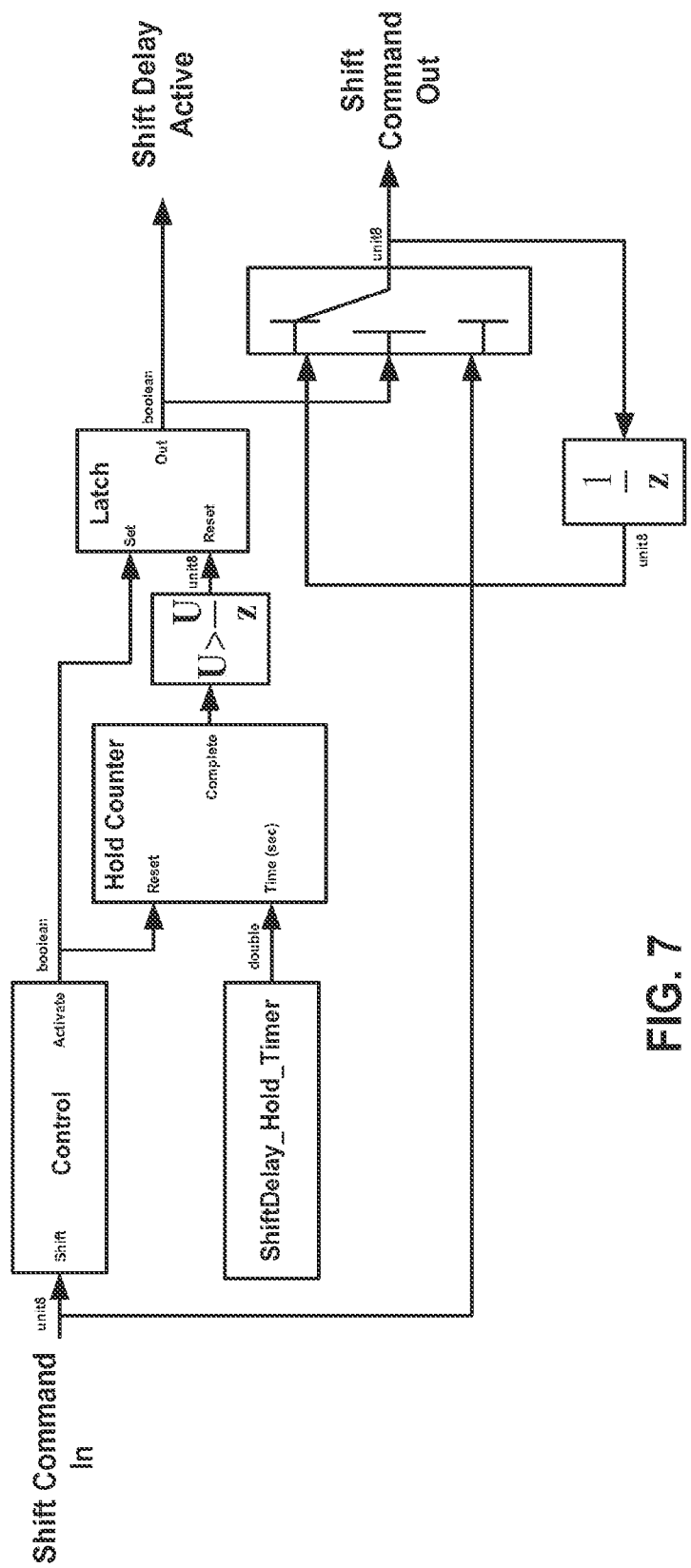
FIG. 7 is a diagram of logic that delays implementation of a shift command to a shift actuator according to an exemplary embodiment.
Figure 8:
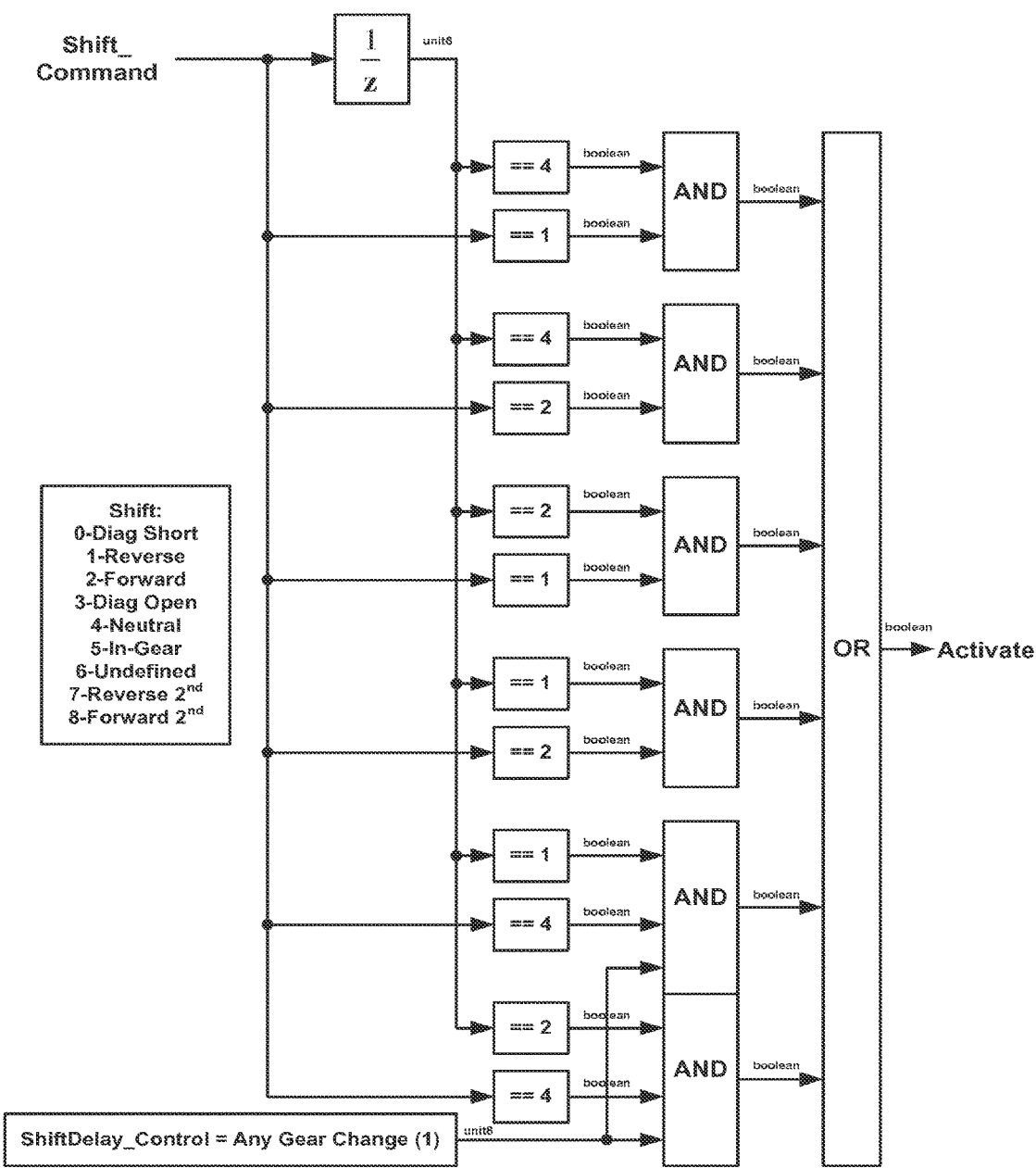
FIG. 8 is a diagram of control logic that determines whether to activate the delay logic of FIG. 7.

FIG. 7 shows exemplary logic that implements a shift delay to the shift actuator 150, in response from the Shift_Command output in states 630 and 650 of FIG. 6, so that the shift event can be timed properly. Whenever the shift delay logic is activated (logic of "control" block is shown in FIG. 8, the calibration "ShiftDelay_Hold_Timer" starts. While counting down the ShiftDelay_Hold_Timer, the logic on the lower left (i.e., "1/z") holds the previous shift command. After the ShiftDelay_Hold_Timer expires, the new Shift_Command is sent to the shift actuator 150 (i.e., the "Shift Command In" is output to the "Shift Command Out").

FIG. 8 shows Shift Delay Activation Control logic, which is the control logic of the "Control" block of FIG. 7. The Shift Delay Activation Control determines when the shift delay logic should become active and start the countdown timer. As can be seen in FIG. 8, the new incoming "Shift_Command" generated for the shift actuator 150 is compared to the previous "Shift_Command" (i.e., "1/z") to determine when to activate the shift delay. A calibration can be provided the "ShiftDelay_Control" in FIG. 8, which would allow a calibrator the option to set whether to activate the delay on any gear change (i.e., in-gear to in-gear, neural to in-gear, and in-gear to neutral) or just when entering gear.

Figure 9:
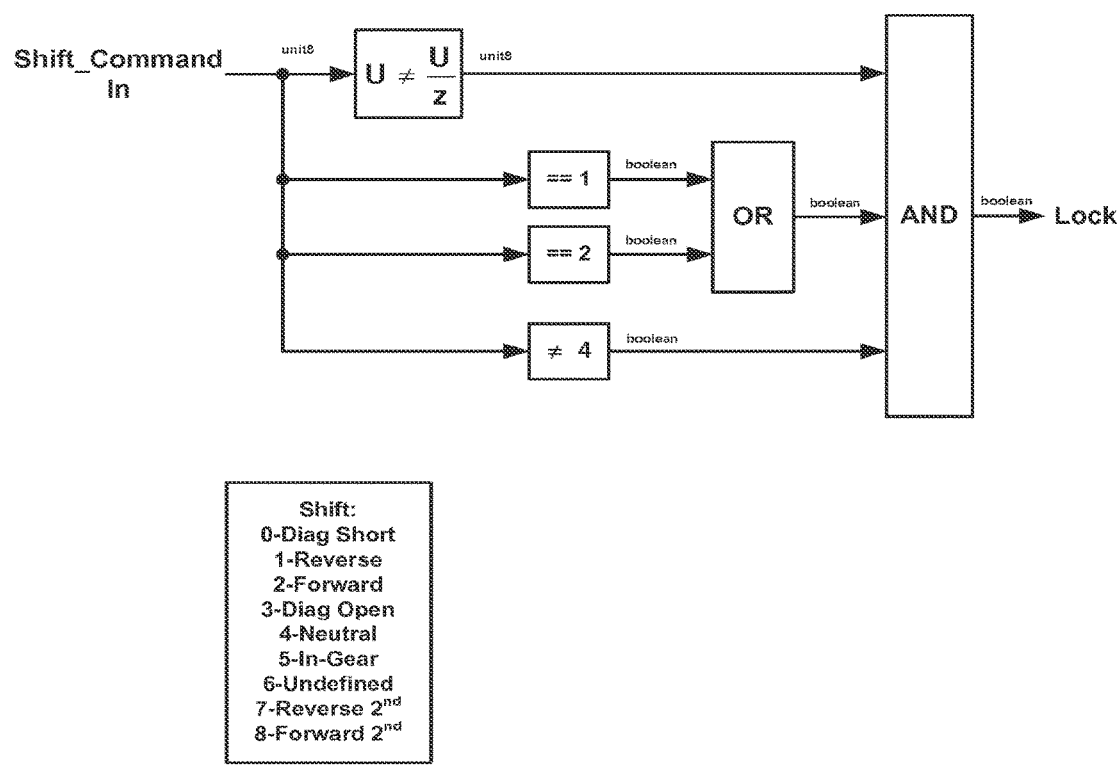
FIG. 9 is a diagram of control logic for determining when to lock out the throttle.
Figure 10:
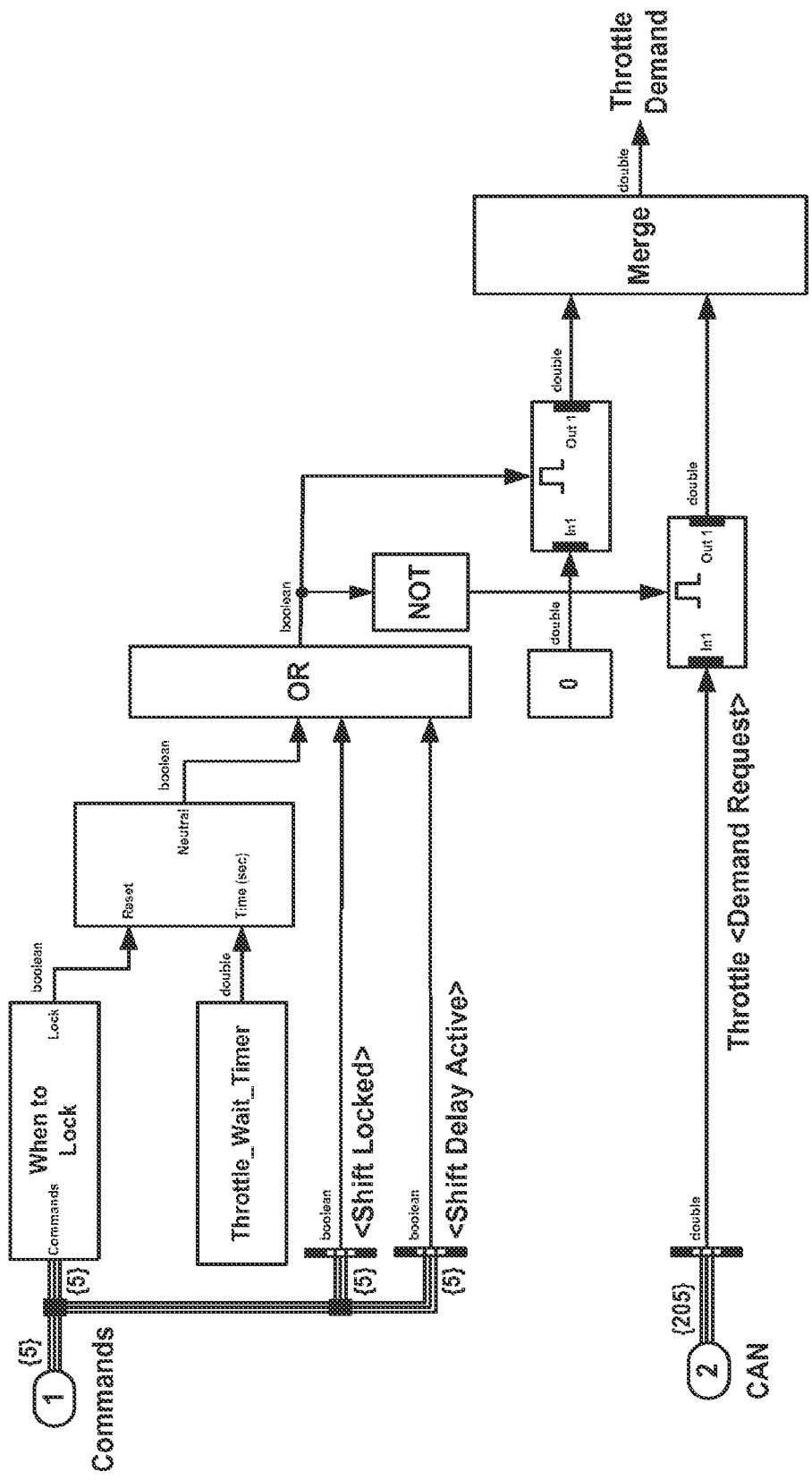
FIG. 10 is a diagram of throttle lockout logic including the control logic of FIG. 9.

A throttle delay can be provided when the Shift Delay Timer expires to allow enough time for the shift to complete, and the shift is driven and engine speed is brought up to the requested throttle command after the throttle delay ends. Thus, once the logic of the engine control system specifies a target engine speed and timing delays to control throttle and shift, the control system monitors the time for which throttle is held and commands the shift event and then allows engine speed to increase to the requested throttle demand. FIG. 9 is a diagram of exemplary control logic for determining when to lock out the throttle. This logic will start the lockout timer when the current "Shift Command" is not equal to the last "Shift_Command", it is not "neutral," and is either "forward" or "reverse." FIG. 10 is a diagram of exemplary throttle lockout logic including the control logic of FIG. 9. The logic of FIG. 10 sets throttle to 0% whenever the "Shift Delay Logic" is active, "Shift_Locked" (via the state machine in FIG. 6) is active, or "When to Lock" is active.

Each of the values of the Shift Delay Timer (t2 to t4), the AntiClunk_Wait_Timer (t2 to t3), the AntiClunk_Hold_Timer (t3 to t5), and the Throttle Delay (Wait) Timer (t4 to t5) can be calibrated. In one embodiment, the Shift Delay Timer has a calibrated value of 500 ms, the AntiClunk_Wait_Timer has a calibrated value of 50 ms, the AntiClunk_Hold_Timer has a calibrated value of 750 ms, and the Throttle Delay Timer has a calibrated value of 300 ms, although timer values can vary depending on a particular application or operating condition.

In other exemplary embodiments, the control system and method may use any system speed reference including but not limited to such references as Transmission Input Speed, Transmission Output Speed, Engine Crank Speed, Engine Cam Speed, Propeller Speed, or Vessel Speed. The strategy may alternatively use a torque reference point instead of system speed.

Of course, the control system and method may be performance tuned to enhance vessel responsiveness and maneuverability, gear noise reduction, stalling mitigation and increased drive reliability.

While various embodiments in accordance with the present invention have been shown and described, it is understood that the invention is not limited thereto.

The present invention may be changed, modified and further applied by those skilled in the art. Therefore, this invention is not limited to the detail shown and described previously, but also includes all such changes and modifications.

What is claimed is:

1. A control system, comprising:
a controller operative to receive a request for a transmission gear shift and to maintain a machine of the control system at a predetermined speed for a predetermined amount of time in response to the received request; and
a shift actuator;
wherein the controller prevents the shift actuator from performing the received request for the predetermined amount of time while the machine is maintained at the predetermined speed, and allows the shift actuator to perform the received request after the predetermined amount of time elapses, and
wherein the predetermined amount of time is determined in response to an activation of anticlunk control associated with the predetermined speed.

2. The control system of claim 1, wherein the controller determines a speed associated with the request and adjusts the machine of the control system to the determined speed after the predetermined amount of time elapses.

3. The control system of claim 1, wherein the machine of the control system includes an engine.

4. The control system of claim 1, further including a shifter and throttle control which sends the request.

5. The control system of claim 2, wherein the speed associated with the request comprises one of a transmission input speed, a transmission output speed, an engine crank speed, an engine cam speed, a propeller speed, and a vessel speed.

6. The control system of claim 3, wherein the controller controls the speed of the engine by at least one of adjusting a throttle, engine ignition timing, and an amount of fuel supplied to the engine.

7. The control system of claim 1, wherein the transmission gear shift comprises a shift from a first gear to a different second gear, wherein the first gear and the second gear each comprise at least one of a neutral position, a forward position, a reverse position, a starboard position, and a port position.

8. A method of controlling a machine, comprising:
receiving a request for a transmission gear shift by a controller;
maintaining, by the controller, a machine at a predetermined speed for a predetermined amount of time in response to receiving the request;
determining the predetermined amount of time in response to an activation of anticlunk control associated with the predetermined speed;
preventing, by the controller, a shift actuator from performing the received request for the predetermined amount of time while the machine is maintained at the predetermined speed; and
allowing, by the controller, the shift actuator to perform the received request after the predetermined amount of time elapses.

9. The method of claim 8, wherein the controller determines a speed associated with the request and adjusts the machine to the determined speed after the predetermined amount of time elapses.

10. The method of claim 9, wherein the machine includes an engine.

11. The method of claim 10, wherein a shifter and throttle control sends the request.

12. The method of claim 9, wherein the speed associated with the request comprises one of a transmission input speed, a transmission output speed, an engine crank speed, an engine cam speed, a propeller speed, and a vessel speed.

13. The method of claim 10, wherein maintaining, by the controller, comprises at least one of adjusting a throttle, engine ignition timing, and an amount of fuel supplied to the engine.

14. The method of claim 8, wherein the transmission gear shift comprises a shift from a first gear to a different second gear, wherein the first gear and the second gear each comprise at least one of a neutral position, a forward position, a reverse position, a starboard position, and a port position.

* * * * *